United States Patent Office 3,740,412
Patented June 19, 1973

3,740,412
IMIDAZOLINE-3-OXIDE-1-OXYL DERIVATIVES
Edwin F. Ullman, Atherton, Ludwig Call, Palo Alto, Richard K. Leute, Sunnyvale, and Jeanne H. Osiecki, Los Altos, Calif., assignors to Synvar Associates, Palo Alto, Calif.
No Drawing. Filed Apr. 8, 1970, Ser. No. 26,750
Int. Cl. C07d 49/30, 49/34
U.S. Cl. 260—309.6          12 Claims

ABSTRACT OF THE DISCLOSURE

Dihydroimidazoles, tetrahydroimidazoles and tautomeric mixtures of dihydroimidazoles and tetrahydroimidazoles having tertiary carbon atoms in the number 4 and number 5 positions of the hydroimidazole ring, and having attached at the $C_2$ position of the imidazole ring a radical selected from the group consisting of —$NR_1R_2$, =$NR_2$, —$NR_2^-$, —$S^-$, —$SR_1$, and —$OR_1$, wherein $R_1$ is hydrogen, alkyl, aryl, alkenyl, alkynyl cycloalkyl and substituted derivatives thereof, and $R_2$ is hydrogen, alkyl, aryl alkenyl, alkynyl, cycloalkyl,

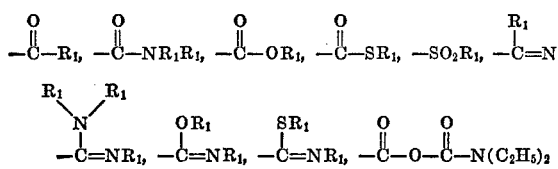

and substituted derivatives thereof. There are one or two oxidized nitrogen atoms in the ring in the form of oxides or hydroxides.

---

This invention relates to dihydroimidazoles, tetrahydroimidazoles and tautomeric mixtures of dihydroimidazoles and tetrahydroimidazoles. More particularly, it relates to imidazoles in which at least one of the ring nitrogen atoms is oxidized to the hydroxide or oxide state.

In accordance with the preferred embodiment of the invention, a large, novel class of new compositions is provided having the following formulae:

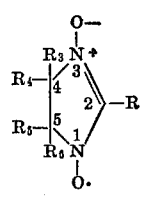

(I)

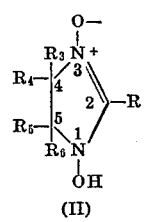

(II)

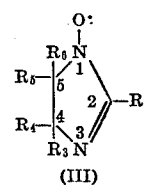

(III)

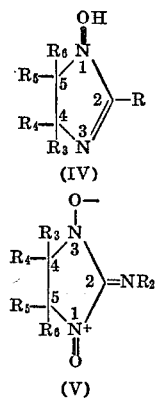

wherein R is generally —$NR_1R_2$, —$NR_2^-$, —$S^-$, —$SR_1$, or $OR_1$. More particularly, R in Formula I is —$NR_1R_2$, —$NR_2^-$, —$S^-$, or —$SR_1$; in Formula II, —$NR_1R_2$, or —$SR_1$; in Formula III, $NR_1R_2$, —$SR$, or $OR_1$; and in Formula IV, —$NR_1R_2$, —$SR_1$, or —$OR_1$. The $R_1$ group is hydrogen, alkyl, aryl, alkenyl, alkynyl, cycloalkyl, and substituted derivatives thereof, and the $R_2$ group is hydrogen, alkyl, aryl, alkenyl, alkynyl, cycloalkyl,

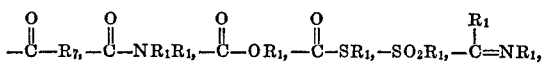

and substituted derivatives thereof. The $R_1$ groups may be the same or different. Two $R_1$ groups or an $R_1$ and $R_2$ group may form part of a common ring. Each of $R_3$, $R_4$, $R_5$ and $R_6$ are an alkyl group, an alkenyl group, an alkynyl group, an aryl group, each of from 1–12 carbon atoms or form part of an alkylene or alkenylene group $R_3$–$R_4$ or $R_5$–$R_6$, said alkylene and alkenylene groups each containing from 3–10 carbon atoms.

Where R is —$NHR_2$ in the compounds of Formulas III and IV, said compounds exist as a tautomeric mixture of dihydro- and tetrahydro-imidazoles as shown below:

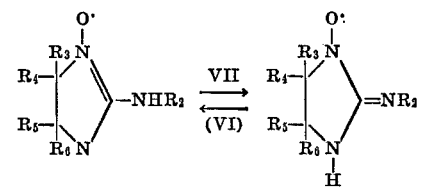

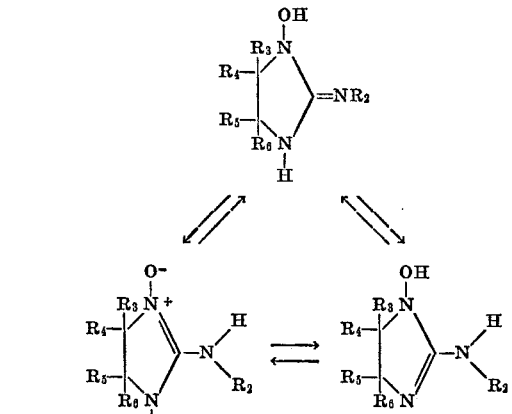

Likewise, in the case where R is —SH or —OH, the compounds of Formula III and IV will exist as tautomeric mixtures of a form similar to that shown in Formulas VI and VII, having the same ring structures, i.e. differing only by the substituted group at the $C_2$ position. Hence, the tautomeric mixtures existing where R is —SH or —OH can be represented by the Formulas VI and VII wherein —$NHR_2$ is replaced by —SH or —OH and =$NR_2$ is replaced by the appropriate =S or =O group. Hereinafter compounds of Formulas III and IV will be referred to without regard as to whether or not they exist as tautomeric mixtures. However, it will be understood for these compounds where R is —OH, —$NHR_2$, or —SH that such an equilibrium mixture exists.

Compositions in accordance with Formula V are useful an oxidizing agents because of their very powerful oxidizing properties. The compounds of Formula I wherein R is —$NR_2^-$ are very good infrared absorbers. The remaining compositions included within the scope of Formulas I, II, III, IV, VI and VII are useful as anti-oxidants. In general, the free radical structures of Formulas I and III are useful for the measurement of weak magnetic fields by known techniques. In addition, because of their free radical structure, the compound Formulas I and III exhibit electron spin resonance (ESR) and can be used as "spin labels" for attachment to biologically active molecules. When used for such a purpose it will usually be desirable to select an appropriate functional group as part of R, $R_3$, $R_4$, $R_5$ or $R_6$ to serve as a "handle" for bonding and attaching the free radical molecule to the biologically active molecule. A more complete discussion of spin labeling techniques is set forth in U.S. patent application Ser. No. 496,622, now Pat. No. 3,489,522, and incorporated herein by reference.

All of the compounds within the scope of the invention differ primarily by a difference in the oxidation state of the imidazole ring nitrogen atoms. All of the compositions have the basic imidazole ring structure with the requisite tertiary carbon atoms in the number 4 and 5 ring positions. In addition, all the compounds have at least one ring nitrogen in an oxidized state in the form an oxide or a hydroxide. All of the compositions are properly termed hydroimidazoles in that at least one of the normally occurring imidazole ring double bonds is saturated. The 4,5-dihydroimidazoles are alternatively referred to herein as imidazolines. Given the hydroimidazole structure, tertiary $C_4$ and tertiary $C_5$ carbon atoms in the ring, and at least one of the ring nitrogens oxidized to the oxide or hydroxide state, the broadest scope of the nature of the R's is contemplated. Details of this aspect wil be discussed in connection with the various means for preparing the compounds.

For ease of discussion, reference will be made frequently to the simplest structure which provides the requisite tertiary character of the $C_4$ and $C_5$ ring carbon atoms. To this end the symbol

will be used to indicate the 4,4,5,5-tetramethyl structure:

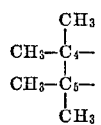

However, the reactions described hereafter are applicable for all compounds where $R_3$, $R_4$, $R_5$ and $R_6$ are within the defined scope.

In general, the compounds of Formula V and the compounds of Formulas I, II, III and IV wherein R is —$NR_1R_2$ and —$NR_2^-$ ($R_1$ and $R_2$ are as defined above), may be prepared from 2-bromoimidazoline-1-oxide-3-oxyls according to the following reaction sequence:

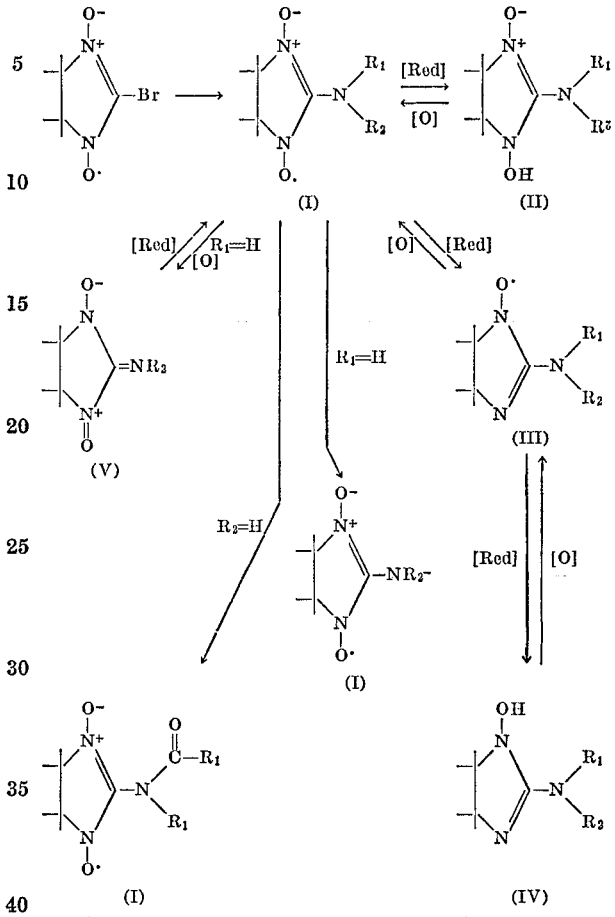

In the above amino reaction sequence the Roman numerals near the formula correspond with the formula described earlier so that one method for preparation of each of the types of the molecules within the scope of the invention can be appreciated. The symbol (Red) stands for reduction, and the symbol (O) stands for oxidation. Further, where $R_1$ is H, the compounds of Formulas III and IV exist as tautomeric mixtures corresponding to those represented by Formulas VI and VII. While it is preferred to use the bromoimidazoline as the starting material, the chloro and iodo derivatives are also suitable.

The acylation reaction shown in the above reaction sequence wherein hydrogen is replaced by a

group is presented by way of illustration only. It should be appreciated that the amino hydrogen may be similarly substituted by —$SO_2R_1$,

and like groups. Such substitution is readily accomplished by reaction of the 2-amino-imidazoline ($R_2$=H) with a corresponding reagent such as $XSO_2R_1$,

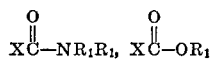

and the like which bears a halogen or other suitable cleaving group.

The reduction of Compound I to Compound II, Compound V to Compound I and Compound III to Compound IV, proceeds rapidly at room temperature and may be carried out for from less than a minute to several hours. Suitable reducing agents and oslvent for these reductions are set out in the following table.

TABLE I

Reduction

I→II
III→IV (1) H₂ plus a catalyst such as platinum in an inert solvent such as ether, benzene, water, alcohol, ethyl acetate, methylene chloride, etc.
(2) NaBH₄ or KBH₄ in a solvent in which the sodium or potassium borohydride is soluble such as water, alcohol, diglyme, tetrahydrofuran, and the like.
(3) Metallic reducing agents such as ferrous sulfate, stannous chloride, chromous chloride, aluminum amalgam, sodium, magnesium, etc. in a water or alcohol solvent.
(4) Electrolysis.

Reduction V→I

The reduction may be carried out by any of the above methods (1)–(4) but is preferably carried out using aqueous hydrogen peroxide with a suitable base such as sodium carbonate.

In the above reduction reactions it should be appreciated that in addition to the reducing agents set forth, any reducing agent may be used which is capable of adding an electron.

The reduction of compound I to compound III presents a special situation since the liberated oxygen necessitates the use of a special reagents for removal thereof. Suitable reducing agents include triphenyl phosphine or other phosphine in an inert solvent such as ether, chloroform, methylene chloride, benzene, hexane, etc. Alternatively, the reaction may be carried out with sodium nitrite in dimethyl formamide or water.

The reverse oxidation reactions may be carried out at the same temperatures and using the same solvents as those employed in the corresponding reduction. Generally, the reactions proceed satisfactorily at room temperature and may take from less than a minute to several hours. Suitable oxidation agents are set out in the following table, though it should be appreciated that any oxidizing agent may be used for oxidations II→I, IV→III and I→V which is capable of removing an electron.

TABLE II oxidation.

II→I
IV→III

Carried out spontaneously in air, or using as an oxidizing agent a halogen, lead dioxide, sodium periodate, manganese dioxide and the like Oxidation I→V Requires a stronger oxidizing agent than air. May use all others listed above for II→I and IV→III oxidation.

The oxidation III→I presents a special situation in that an oxidizing agent is required which can supply an oxygen atom. Suitable agents include peracids, such as meta chloroperbenzoic acid or H₂O₂ with a sodium tungstate or phosphotungstic acid catalyst.

The amino substituted hydroimidazoles may be prepared in the following manner:

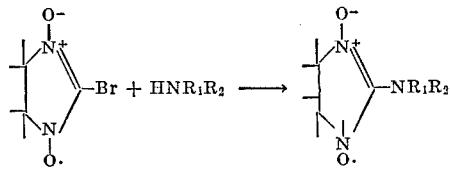

Such reactions are preferably carried out in water or alcohol except when highly reactive amines are employed where other inert solvents may be used such as ether, tetrahydrofuran, acetonitrile and the like. Reaction temperatures range from between 0° C. to 100° C., and times from 1 hour to 24 hours. The optimum time and temperature of the reaction will depend upon the particular solvent and reagents chosen, and can easily be determined by routine experimentation.

In the above illustrated formula for the preparation of the amino substituted hydroimidazoles it is to be appreciated that all $R_1$ groups fall within the scope of $R_2$ and that $R_1$ and $R_2$ may therefore be the same. It should be further appreciated that the definitions of $R_1$ and $R_2$ which appear immediately below are given as only typical of those that may be used in the above reaction. Further, though not explicitly set forth in the definitions below, $R_2$ may also be any of the groups defined for $R_1$.

Typical $R_2$ groups within the scope of the broad definition include hydrogen, methyl, ethyl, isopropyl, butyl, 2-methyl pentyl, phenyl, o-tolyl, allyl, cyclohexyl, 2-butyn-4-yl and the like. Typical $R_1$ groups include:

—CH₂CH=CH₂
—CH(CH₃)COOH
—CH₂CH=CHCH₃
—CH₂CH(OCH₃)₂
—CH₂COC₆H₅
—CH₂CH(OH)CH₂CH₃
—CH(CH₃)CH₂CH₂CH₂N(C₂H₅)₂
nitrophenyl
fluorophenyl

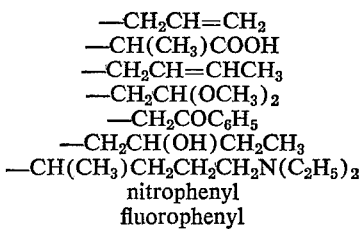

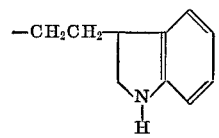

—CH₂C₆H₄COCH₃
—C₆H₄SO₃H

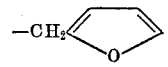

—CH(CH₃)CH(OH)C₆H₄OH
1-cyanocyclohexyl
—C₆H₄COOH
—CH₂CH₂SCH₃
—C₆H₄CN and

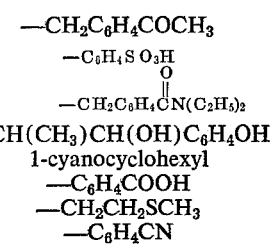

Typical $R_1$—$R_2$ groups include:

—CH₂CH₂CH₂CH₂CH₂CH₂—
—CH₂CH₂OCH₂CH₂—
—CH₂CH₂N(CH₃)CH₂CH₂—

The following examples are illustrative of amino substituted hydroimidazole preparations.

Example A.—Ten mg. of N,N'-dihydroxy-2,3-diamino-2,3-dimethylbutane in 10 ml. of benzene was heated with 100 mg. of chloromethyl ether at reflux for 5 minutes. The resulting mixture was then heated with stirring with solid sodium carbonate, filtered and then washed with water. After drying over sodium sulfate, the resulting solution was stirred with excess PbO₂ and then filtered. On evaporation of the solvent a bright red residue of the 1-oxyl-3-oxide-4,4,5,5-tetramethyl - 4,5 - dihydroimidazole was obtained.

Example B.—1-oxyl-3-oxide - 4,4,5,5 - tetramethyl-4,5-dihydroimidazole radical (200 mg., 1.27×10⁻³ mole) and sodium bicarbonate (200 mg.) were dissolved in water (80 ml.). Cyanogen bromide (320 mg., 3×10⁻³ mole) was added and the mixture stirred for one hour at 30° C. The reaction was followed by thin layer chromatography and when all the starting radical had disappeared, the solution was extracted with an equal volume of chloroform. The chloroform extract was washed twice with a little water, dried over sodium sulfate and filtered. The chloroform was removed in vacuo without excessive heating to yield the bromo compound (243 mg., 81%) which decomposed between 90° and 100° and melted between 140 and 150°.

*Analysis.*—Calculated for $C_7H_{12}N_2O_2Br$ (percent): C, 35.60; H, 5.13; N, 11.86; Br, 33.84. Found (percent): C, 35.78; H, 5.22; N, 11.92; Br, 33.78. M.W. by mass spectrometry 235, $\lambda_{max.}^{ethanol}$ 320, 540, 565 m$\mu$ ($\epsilon$ 15,600, 1,240,1,158).

Example C.—The bromoradical (100 mg., 0.423 mmole) was dissolved in dimethylformamide (5 ml.) containing a trace (<1 mg.) of hydrogen chloride gas. Sodium nitrite (500 mg.) was added and the mixture shaken. The color almost immediately turned from purple to orange. The mixture was poured into water (25 ml.) and extracted with chloroform (2× 25 ml.). The chloroform extract was dried, filtered and evaporated. The residue was chromatographed on silica gel (50 cm. long x 3 cm. diameter) using benzene as eluent. The eluent containing the first orange-brown band was collected and the solvent removed in vacuo to leave a brown oil which crystallized to yield 38 mg. (41%) of the 1-oxyl-2-bromo-4,4,5,5-tetrabromoimidazoline, M.P. 54°.

KBr max. 850, 1140, 1170, 1220, 1370, 1440, 1520 cm.$^{-1}$. EtOH max. 270 m$\mu$ ($\epsilon$ 6400) M.W. by mass spectrometry 219,221, equal intensity doublet).

EXAMPLE 1

Preparation of 2-amino-4,4,5,5-tetramethylimidazoline-3-oxide-1-oxyl

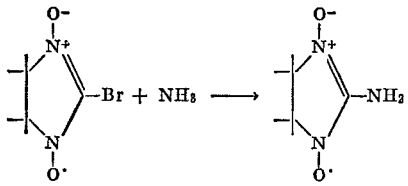

A solution of 2.0 g. of 2-bromo-4,4,5,5-tetramethylimidazoline-3-oxide-1-oxyl in 100 ml. of concentrated aqueous ammonia kept at 65–70° C. is bubbled with gaseous ammonia over a period of two hours. After saturating the solution with $NH_4Cl$ and cooling to room temperature, the solution is extracted 30 times with 50 ml. portions of $CH_2Cl_2$. The combined organic phases are dried over $Na_2SO_4$ and evaporated in vacuo at 25° C. to leave 1.22 g. (83%) of an almost black, crystalline residue, the named product. This product is triturated with several 3 ml. portions of benzene until the filtrate changes from green to a pure blue in color. The remaining residue, 710 mg., is recrystallized from benzene-hexane, M.P. 146–148° C.

*Analysis.*—Calcd. for $C_7H_{14}N_3O_2$ (percent): C, 48.82; H, 8.19; N, 24.40. Found (percent): C, 48.74; H, 8.05; N, 24.34.

EXAMPLE 2

Preparation of 2-isopropylamino-4,4,5,5-tetramethylimidazoline-3-oxide-1-oxyl

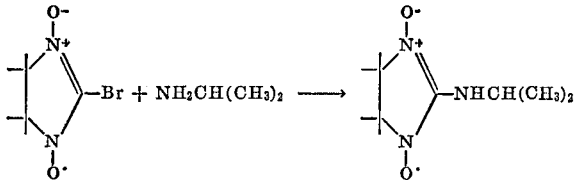

A solution of 1.5 g. of 2-bromo-4,4,5,5-tetramethyl- imidazoline-3-oxide-1-oxyl dissolved in 50 ml. of isopropylamine plus 50 ml. of water is prepared. This solution is boiled under gentle reflux (55–60° C.) for 2½ hours. After cooling to room temperature, the solution is evaporated to remove most of the excess amine, saturated with NaCl and extracted 5 times with 50 ml. portions of $CH_2Cl_2$. The combined organic phases are dried over $Na_2SO_4$ and evaporated in vacuo at 20° C. to leave 900 mg. of almost black crystals. Recrystallization from pentane gives 850 mg. (60%) of the named product, M.P. 119–122° C.

*Analysis.*—Calcd. for $C_{10}H_{20}N_3O_2$ (percent): C, 56.05; H, 9.41; N, 19.61. Found (percent): C, 56.03; H, 9.30; N, 19.33.

EXAMPLE 3

Preparation of 2-dimethylamino-4,4,5,5-tetramethylimidazoline-3-oxide-1-oxyl

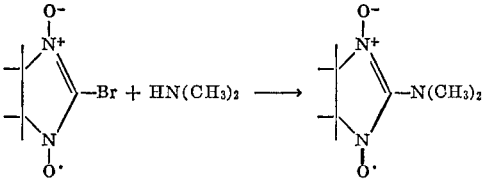

A solution of 1.0 g. of 2-bromo-4,4,5,5-tetramethylimidazoline-3-oxide-1-oxyl dissolved in 50 ml. of a 40% aqueous solution of dimethylamine is prepared. After standing at room temperature for about 2 hours the solution is extracted with three 50 ml. portions of $CH_2Cl_2$. To the resulting nearly colorless aqueous phase is added 0.5 ml. portions of a 0.1 molar aqueous solution of $NaIO_4$. After each addition the solution is extracted immediately with $CH_2Cl_2$, until on further addition of $NaIO_4$ no blue color is produced. The combined extracts are dried over $Na_2SO_4$ and evaporated in vacuo to yield 700 mg. of a blue oil. Chromatography on silica followed by two recrystallizations from hexane yields 300 mg. (35%) of the named product, M.P. 98–104° C.

*Analysis.*—Calcd. for $C_9H_{18}N_3O_2$ (percent): C, 53.97; H, 9.06; N, 20.98. Found (percent): C, 54.06; H, 8.98; N, 21.02.

EXAMPLE 4

Preparation of 2-ethyleneimino-4,4,5,5-tetramethylimidazoline-3-oxide-1-oxyl

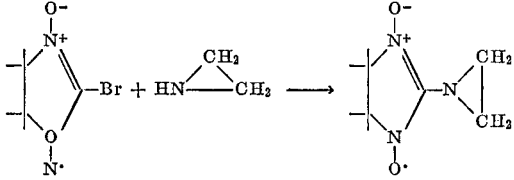

To 1.5 g. of 2-bromo-4,4,5,5-tetramethylimidazoline-3-oxide-1-oxyl dissolved in 200 ml. absolute ether, is added 15 ml. of ethyleneimine and 30 ml. of dry $Et_3N$. The mixture is heated at reflux for three hours, filtered, and added to a mixture of water and ether. The aqueous phase is extracted two times with $CH_2Cl_2$ and the combined organic phases dried over $Na_2SO_4$ and evaporated in vacuo. The oily residue is separated by preparative thin layer chromatography on silica gel to give 70 mg. of the blue semicrystalline product together with 450 mg. of starting material. On recrystallization from ether-pentane there is obtained 60 mg. (13%) of the pure named product, M.P. 85–87° C.

*Analysis.*—Calcd. for $C_9H_{16}N_3O_2$ (percent): C, 54.52; H, 8.14; N, 21.20. Found (percent): C, 54.42; H, 8.18; N, 21.25.

The amino derivatives prepared in the above-described manner may, in the case where $R_2$ is hydrogen, be converted to other derivatives by a suitable acylation reaction in which the amino-hydrogen is replaced by other groups such as acetyl, benzoyl, carbethoxy, diethylaminocarbonyloxycarbonyl, phenyl sulfonyl, and the like. The reaction takes place as follows:

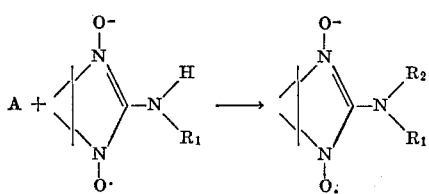

Typical "A" reactants and the corresponding R₂ groups include:

| A | R₂ |
|---|---|
| (CH₃CO—)₂O | CH₃CO— |
| (C₆H₅—CO—)₂O (dibenzoyl) | C₆H₅—CO— |
| (cyclobutane dicarbonyl)₂O | cyclobutyl-CO— |
| C₆H₅COCl | C₆H₅—CO— |
| NO₂C₆H₄COCl | NO₂C₆H₄—CO— |
| cyclohexyl-COCl | cyclohexyl-CO— |
| phthalic anhydride | —COOH, —CO— (o-substituted) |
| CH₃—C₆H₄—SO₂Cl | CH₃—C₆H₄—SO₂— |
| C₆H₅—C(=NOCH₃)Cl | C₆H₅—C(=NOCH₃)— |
| (CH₃)₂CHCOCl | (CH₃)₂CH—CO— |
| C₂H₅OCOCOCl | C₂H₅OCO—CO— |
| C₆H₅CH=CHCOCl | C₆H₅CH=CH—CO— |
| CH₃OC₆H₄COCl | CH₃OC₆H₄—CO— |
| C₂H₅OCOCH₂CH₂COCl | C₂H₅OCOCH₂CH₂—CO— |
| (C₂H₅)₂NC₆H₄COCl | (C₂H₅)₂NC₆H₄—CO— |
| pyridyl-COCl | pyridyl-CO— |
| CH₃CONHCH₂CH₂COCl | CH₃CONHCH₂CH₂—CO— |
| C₈H₁₇COCl | C₈H₁₇—CO— |
| C₂H₅OCOCl | C₂H₅O—CO— |
| CH₂=CHCH₂N=C=O | CH₂=CHCH₂NH—CO— |
| (CH₃)₃CN=C=O | (CH₃)₃CNH—CO— |
| C₆H₅N=C=O | C₆H₅NHCO— |
| C₆H₅—N=C=O | C₆H₅—NH—CO— |

The reaction is carried out in an inert solvent such as methylene chloride, ether, benzene, chloroform, water or alcohol with a soluble base such as triethylamine (in organic solvents) or sodium hydroxide in water, and reacted at times ranging from between 10 minutes to 10 hours. The particular temperature and time of reaction will depend upon the reactivity of the amino radical and acylating agents employed. Condensation of carboxylic acids as "A" reagents may also be carried out by the use of dicyclohexylcarbodiimide, preferably in ethyl acetate. The reaction proceeds at room temperature.

The following examples serve to illustrate the above replacement reactions within the scope of this invention.

EXAMPLE 5

Preparation of 2-(N-acetyl-N-isopropylamino)-4,4,5,5-tetramethylimidazoline-3-oxide-1-oxyl

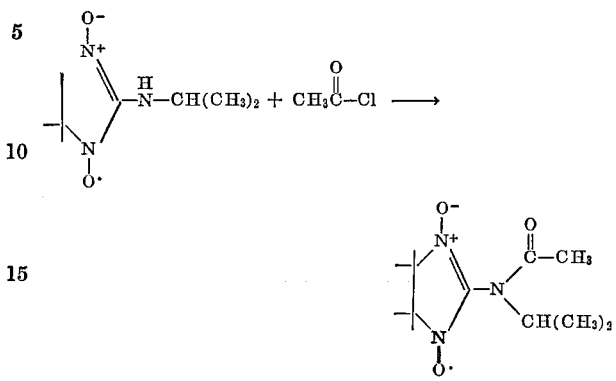

To 250 mg. of 2-isopropylamino-4,4,5,5-tetramethylimidazoline - 3 - oxide - 1 - oxyl prepared by the procedure of Example 2 dissolved in 20 ml. CH₂Cl₂ is subsequently added 1.2 ml. of dry Et₃N. Thereafter the solution is cooled to about —20° C. Acetyl chloride is then added dropwise until most of the starting material is consumed as demonstrated by thin layer chromatography. After warming up to room temperature, the solution is extracted twice with water, then successively with 10% NaHCO₃ solution, water, 5% HCl and finally water. The organic phase is dried over Na₂SO₄ and evaporated in vacuo at 20° C. to leave a partially crystalline red residue. Reprecipitation from benzenehexane gives 125 mg. of the named product (42%), M.P. 96–99° C. On recrystallization from ether-hexane the melting point increased to 112–114° C.

*Analysis.*—Calcd. for C₁₂H₂₂N₃O₃ (percent): C, 56.23; H, 8.65; N, 16.40. Found (percent): C, 56.53; H, 8.63; N, 16.10.

EXAMPLE 6

Preparation of 2-(N-benzoyl-N-isopropyl-amino)-4,4,5,5-tetramethylamidazoline-3-oxide-1-oxyl

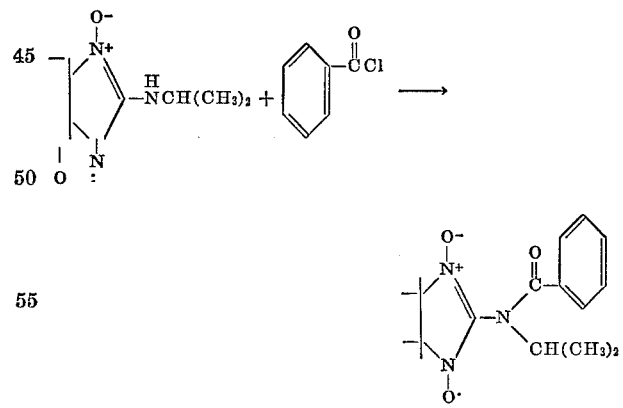

To a stirred solution of 250 mg. of 2-isopropylamino-4,4,5,5-tetramethylimidazoline-3-oxide - 1 - oxyl prepared following the procedure of Example 2 in 20 ml. CH₂Cl₂ is added 4 ml. of dry Et₃N followed by a solution of 1 ml. of benzoylchloride in 5 ml. of CH₂Cl₂. After stirring for 30 minutes at room temperature, the purple solution is washed successively with water, 2 N HCl, water, NaHCO₃ and water and dried over Na₂SO₄. Evaporation in vacuo at 20° C. gives a purple oil, which is chromatographed on silica gel and recrystallized twice from pentane to give 170 mg. (46%) of the named product, M.P. 91–97° C. A third recrystallization increased the melting point to 106–107° C.

*Analysis.*—Calcd. for C₁₇H₂₄N₃O₃ (percent): C, 64.13; H, 7.60; N, 13.20. Found (percent): C, 63.96; H, 7.48; N, 13.02.

EXAMPLE 7

Preparation of 2-(N-carbethoxy-N-isopropylamino)-
4,4,5,5-tetramethylimidazoline-3-oxide-1-oxyl

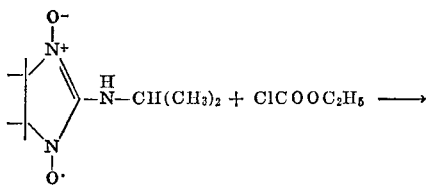

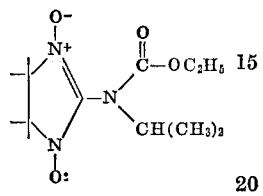

To a stirred solution of 150 mg. of 2-isopropylamino-4,4,5,5-tetramethylimidazoline-3-oxide-1-oxyl in 10 ml. of 2 N NaOH is added with cooling 2 ml. of ethylchloroformate. After stirring vigorously for 2 hours at room temperature the solution is extracted with three 50 ml. portions of $CH_2Cl_2$. The combined extracts are washed with water, dried over $Na_2SO_4$ and evaporated in vacuo to yield a purple oil. Thin layer chromatography on silica gel using ether as solvent yields 39 mg. (19%) of the named product, M.P. 55–65° C. On recrystallization from ether the melting point is increased to 68–71° C.

*Analysis.*—Calcd. for $C_{13}H_{24}N_3O_4$ (percent): C, 54.53; H, 8.45; N, 14.58. Found (percent): C, 54.29; H, 8.35; N, 14.40.

The acylation of the amino imidazoline to the 2-(N-diethylaminocarbonyloxycarbonyl) derivative thereof is obtained by a special reaction specific for this product. The amino imidazoline is reacted with phosgene in the presence of triethyl amine in a manner as is illustrated in the following example.

EXAMPLE 8

Preparation of 2-(N-diethylaminocarbonyloxycarbonyl-N-isopropylamino) - 4,4,5,5-tetramethylimidazoline-3-oxide-1-oxyl

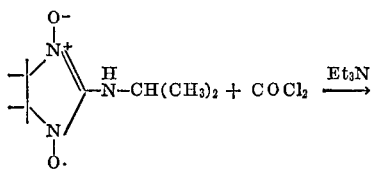

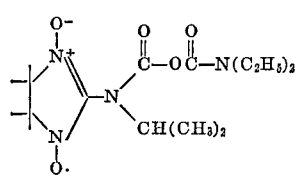

To a solution of 200 mg. of 2-isopropylamino-4,4,5,5-tetramethylimidazoline-3-oxide-1-oxyl in 5 ml. $CH_2Cl_2$ is added 1 ml. of dry $Et_3N$ and the solution cooled to —20° C. A 12% solution of phosgene in benzene is then added dropwise, until the starting material had been consumed as demonstrated by thin layer chromatography. The resulting brown solution is warmed to room temperature and extracted successively with water, twice with 2 N HCl and again with water. After drying over $Na_2SO_4$, the solution is evaporated in vacuo to yield 70 mg. of a purple oil. Preparative thin layer chromatography on silica gel followed by recrystallization from pentane gives 13 mg. of the named product, M.P. 94–98° C.

*Analysis.*—Calcd. for $C_{16}H_{29}N_4O_5$ (percent): C, 53.79; H, 8.18; N, 15.68. Found (percent): C, 53.90; H, 8.10; N, 15.68.

The amino substituted imidazoles of Formula I are reduced to the compounds of Formula II in the presence of a suitable reducing agent, such as platinum in the presence of hydrogen (Table I), under the general reaction conditions described above. The reverse oxidations may be carried out using the same solvents as employed in the reduction reaction, the oxidizing agent selected from among those listed in Table II. The following reduction reactions are presented by way of illustration.

EXAMPLE 9

2-amino-1-hydroxy-4,4,5,5-tetramethylimidazoline-3-oxide

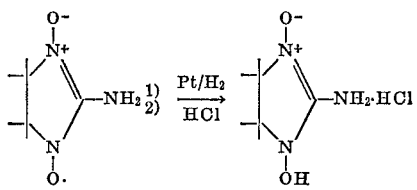

A solution of 170 mg. of 2-amino-4,4,5,5-tetramethylimidazoline-3-oxide-1-oxyl in 10 ml. of methanol is stirred with 5 mg. of platinum catalyst under $H_2$ at room temperature and normal pressure. Within 10 minutes the solution is completely colorless. It is filtered rapidly three times through Celite and then acidified with methanolic hydrogen chloride. Evaporation of the solvent in vacuo and recrystallization from methanol-ether yield 80 mg. (39%) of the named product, M.P. 163–167° C.

*Analysis.*—Calcd. for $C_7H_{16}N_3O_2Cl$ (percent): C, 40.09; H, 7.69; N, 20.04; Cl, 16.91. Found (percent): C, 39.93; H, 7.42; N, 19.82; Cl, 17.05.

The free amine is isolated by extraction of an aqueous potassium carbonate solution of the product with methylene chloride. The extracts are dried over sodium sulfate and then evaporated to dryness in vacuo to yield the amine.

EXAMPLE 10

Following the procedures of Example 9, 2-isopropylamino-4,4,5,5-tetramethyl imidazoline-3-oxide-1-oxyl,
2-(N-benzoyl-N-isopropylamino)-4,4,5,5-tetramethyl imidazoline-3-oxide-1-oxyl,
2-(N-carboethoxy-N-isopropylamino)-4,4,5,5-tetramethyl imidazoline-3-oxide-1-oxyl and
2-(N-phenyl-N-isopropylamino)-4,4,5,5-tetramethyl imidazoline-3-oxide-1-oxyl are reacted with platinum in the presence of $H_2$ to yield the corresponding 1-hydroxy-imidazoline-3-oxide hydrochlorides from which the free bases are subsequently isolated.

The thus obtained amines are then oxidized using $PbO_2$ in benzene to obtain the imidazoline-3-oxide-1-oxyls.

The imidazoline-3-oxide-1-oxyl derivative substituted at the $C_2$ position with —$NR_2$—, where $R_2$ is as defined, above can be prepared from the corresponding 2-aminoimidazoline-3-oxide-1-oxyl where $R_1$ is hydrogen by reaction with a base in the presence of a suitable solvent such as dry dimethyl sulfoxide (DMSO), t-butyl alcohol, tetrahydrofuran, dimethoxyethane, and the like. The strength of the base used will depend upon the electron withdrawing capacity of the $R_2$ group. Where $R_2$ is acyl, a group having a high electron withdrawing capacity, a weak base is chosen. Where $R_2$ is an alkyl, alkenyl or alkynyl group, etc. having a lower electron withdrawing capacity, a stronger base such as potassium t-butylate is chosen. The reaction with base (weak or strong) is very fast, proceeding easily at room temperature.

EXAMPLE 11

Preparation of 2-amido-4,4,5,5-tetramethylimidazoline-3-oxide-1-oxyl potassium salt

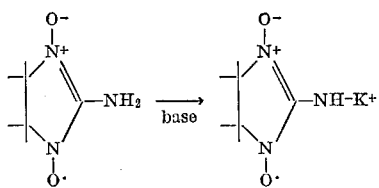

To a saturated solution of potassium t-butylate in dry DMSO is added a small amount of 2-amino-4,4,5,5-tetramethylimidazoline-3-oxide-1-oxyl. A very pale-green solution is obtained which had a strong ESR signal. On addition of water, the blue color and the ESR signal of the starting material is regenerated. The absence of absorption in the visible region of the spectrum by this anion, and the appearance of strong absorption in the near infrared (880 m$\mu$, $\epsilon$ 3010) make solutions of this compound useful as a filter for selective absorption of infrared radiation.

EXAMPLE 12

Preparation of 2-isopropylamido-4,4,5,5-tetramethylimidazoline-3-oxide-1-oxyl potassium salt

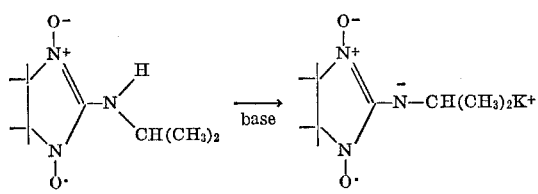

To several ml. of a saturated solution of potassium-tert-butoxide in dry DSMO is added 2 mg. of 2-isopropylamino-4,4,5,5-tetramethylimidazoline - 3 - oxide - 1 - oxyl, whereupon an almost colorless solution of the anion is obtained. On addition of water, the solution turns to blue and displays an ESR spectrum characteristic of the starting material. Solutions of the anion have strong absorption in the near infrared (995 m$\mu$, $\epsilon$ 2520) which make them useful as filters for infrared light.

The 2 - amino - 4,4,5,5 - tetramethylimidazoline-1-oxyl compounds of Formula III are prepared by an appropriate reduction of the 2-amino-4,4,5,5-tetramethylimidazoline-3-oxide-1-oxyl compounds of Formula I, the reducing agents, solvents, and general conditions in accord with those previously set forth. The reverse oxidation reactions may be carried out subject to the general conditions as already described.

EXAMPLE 13

Reduction of 2-amino-4,4,5,5-tetramethylimidazoline-3-oxide-1-oxyl to 2-amino-4,4,5,5-tetramethylimidazoline-1-oxyl

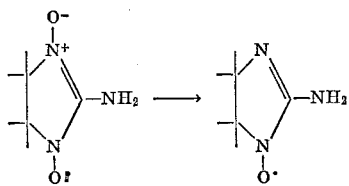

To 0.47 g. of 2-amino-4,4,5,5-tetramethylimidazoline-3-oxide-1-oxyl in 20 ml. of water is added 0.1 ml. of acetic acid followed by 0.28 g. of sodium nitrite. The mixture is stirred at room temperature for 20 minutes and then repeatedly extracted with methylene chloride. The crude orange product is obtained by evaporation of the extracts. Further purification is achieved by chromatography on silica gel with ether as solvent to obtain the named product.

Alternatively the 2-amino-4,4,5,5-tetramethylimidazoline-1-oxyls may be prepared by reaction of 2-bromo-4,4,5,5-tetramethylimidazoline-1-oxyl with the desired amine. The 2-bromo - 4,4,5,5 - tetramethylimidazoline-1-oxyl is itself prepared by appropriate reduction of the corresponding bromoimidazoline-3-oxide-1-oxyl.

The reaction of the bromo-tetramethylene imidazoline-1-oxyl with a suitable amino compound to form the 2-amino derivative can be conducted in polar solvents such as water, alcohol, dimethylformamide, dimethyl sulfoxide, etc., at temperatures ranging from 50° C. to 150° C., the reaction carried out at from 1 to 24 hours. The particular conditions will depend upon the reactivity of the amine. Amines that are insoluble in water require organic solvents.

EXAMPLE 14

Preparation of 2-amino-4,4,5,5-tetramethylimidazoline-1-oxyl

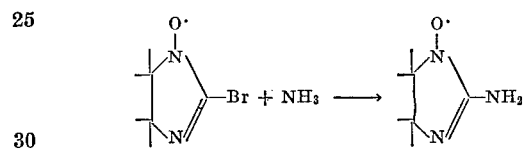

To 1.0 g. of 2-bromo-4,4,5,5-tetramethylimidazoline-1-oxyl heated at reflux in 100 ml. of ammonium hydroxide is bubbled in ammonia over a period of five hours. After cooling to room temperature, the solution is evaporated in vacuo and then stirred with 20 g. PbO$_2$. After filtering twice through Celite®, a diatomaceous earth, extracting with five 50 ml. portions of CH$_2$Cl$_2$, the combined organic phases are dried over Na$_2$SO$_4$ and evaporated in vacuo. The semicrystalline residue is recrystallized from hexane to give 500 mg. (70%) of the named product, M.P. 130–140° C. A second recrystallization increases the melting point to 141–144° C.

*Analysis.*—Calcd. for C$_7$H$_{14}$N$_3$O (percent): C, 53.82; H, 9.02; N, 26.90. Found (percent): C, 53.79; H, 8.99; N, 27.03.

EXAMPLE 15

Preparation of 2-isopropylamino-4,4,5,5-tetramethylimidazoline-1-oxyl

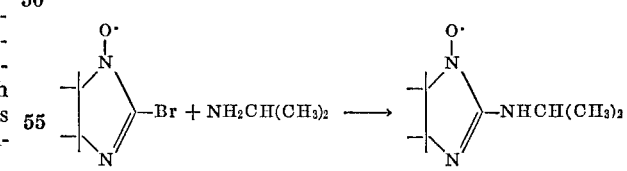

A solution of 2-bromo-4,4,5,5-tetramethylimidazoline-1-oxyl dissolved in 25 ml. isopropylamine and 25 ml. of water is heated under gentle reflux (55–60° C.) for four hours. The almost colorless solution shows only a very weak ESR signal. After cooling to room temperature the solution is concentrated in vacuo and then stirred with 10 g. of PbO$_2$. The solution is then filtered three times through Celite® and the filtrate extracted with five 50 ml. portions of CH$_2$Cl$_2$. The combined organic phases are dried over Na$_2$SO$_4$ and evaporated in vacuo to leave a brown oil. Chromatography of this residue on silica gel yields 100 mg. (44%) of the named product, M.P. 46–48° C. A sample is recrystallized for analysis from pentane.

*Analysis.*—Calcd. for C$_{10}$H$_{20}$N$_3$O (percent): C, 60.57; H, 10.17; N, 21.19. Found (percent): C, 59.91; H, 9.99; N, 20.84.

EXAMPLE 16

Preparation of 2-dimethylamino-4,4,5,5-tetramethyl-imidazoline-1-oxyl

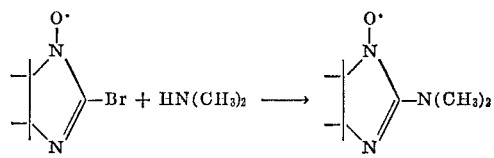

A solution of 500 mg. 2 - bromo-4,4,5,5 - tetramethyl-imidazoline-1-oxyl is heated under gentle reflux with 20 ml. of 50% aqueous dimethylamine. After 90 minutes the solution is almost colorless. Most of the excess amine is removed by evaporation in vacuo and the residual solution then stirred with 10 g. of $PbO_2$, filtered three times through Celite®, and extracted with three 50 ml. portions of $CH_2Cl_2$. The combined extracts are dried over $Na_2SO_4$ and evaporated to leave 230 mg. (52%) of the brown liquid radical, the named product. An analytical sample is obtained by molecular distillation at 0.05 mm.

Analysis.—Calcd. for $C_9H_{18}N_3O$ (percent): C, 58.66; H, 9.85; N, 22.81. Found (percent): C, 58.46; H, 9.63; N, 22.93.

As a special case, where it is desired to obtain a tetramethylimidazoline-1-oxyl wherein R is

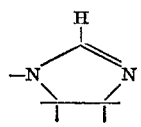

4,4,5,5-tetramethylimidazoline - 1 - oxyl is dissolved in ether, and thereafter recovered in a suitable manner. This reaction is illustrated by the following example.

EXAMPLE 17

Preparation of 2-(4,4,5,5-tetramethylimidazolin-1-yl)-4,4,5,5-tetramethylimidazoline-1-oxyl

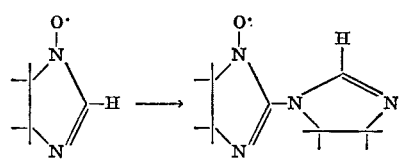

A 0.35 g. sample of 4,4,5,5-tetramethylimidazoline-1-oxyl is allowed to stand at room temperature overnight. Addition of ether precipitates 1-hydroxyl-4,4,5,5-tetramethylimidazolidinone whereas the filtrate contains the title compound. The filtrate is chromatographed on silica gel with ether to yield an orange solid, 0.152 g. (70% yield), which after recrystallization from chloroform melts at 70–71° C.

Analysis.—Calcd. for $C_{14}H_{25}N_4O$ (percent): C, 63.36; H, 9.50; N, 21.11; mol wt. 265. Found (percent): C, 62.85; H, 9.52; N, 20.65; m/c 265 (M+).

The 2-amino-1-hydroxyimidazolines of Formula IV are prepared by the reduction of the corresponding 2-amino-imidazoline-1-oxyl (III) employing the same methods as those described for reduction of 2-amino-imidazoline-3-oxide-1-oxyls. The same reducing agents and the same solvents, etc. may be employed. It should be appreciated that the reverse oxidation reactions can be carried out in accord with the general conditions as already set forth. The following examples are presented for the purpose of illustration.

EXAMPLE 18

Preparation of 2-amino-1-hydroxy-4,4,5,5-tetramethylimidazoline

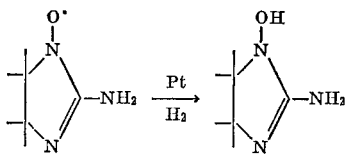

A solution of 70 mg. of 2-amino-4,4,5,5-tetramethyl-imidazoline-1-oxyl in 50 ml. of methanol containing 5 mg. of platinum catalyst is stirred under $H_2$ at room temperature and at normal pressure until it becomes colorless. The solution is then filtered through Celite® and evaporated in vacuo. The slightly yellow residue is recrystallized from methanol-acetone to give 20 mg. of the named product, M.P. 141–144° C.

In the above reaction, the 2-amino-1-hydroxy-4,4,5,5-tetramethylimidazoline is actually obtained as a tautomeric mixture of said imidazoline, 2-amino-4,4,5,5-tetramethylimidazoline-3-oxide and 1-hydroxy-2-imino-4,4,5,5-tetramethylimidazolidine.

EXAMPLE 19

2-dimethylamino-1-hydroxy-4,4,5,5-tetramethyl-imidazoline

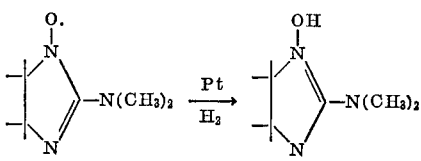

A solution of 50 mg. of 2-dimethylamino-4,4,5,5-tetramethylimidazoline-1-oxyl in 50 ml. of methanol containing 5 mg. of platinum catalyst is stirred under $H_2$ at room temperature and ordinary pressure until the solution becomes colorless. The solution is then filtered through Celite® and evaporated in vacuo. The residue is recrystallized from acetone to give 15 mg. of product (sublimes without melting above 190° C.).

Analysis.—Calcd. for $C_9H_{19}N_3O$ (percent): C, 58.34; H, 10.34; N, 22.68. Found (percent): C, 58.33; H, 10.27; N, 22.47.

EXAMPLE 20

1-hydroxy-2-(4,4,5,5-tetramethylimidazolin-1-yl)-4,4,5,5-tetramethylimidazoline

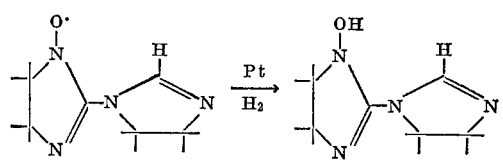

A solution of 30 mg. of 2-(4,4,5,5-tetramethylimidazolin - 1-yl)-4,4,5,5-tetramethylimidazoline-1-oxyl, prepared according to the method of Example 17, dissolved in 5 ml. of ethyl acetate is catalytically reduced by stirring in a hydrogen atmosphere over a palladium on charcoal catalyst. Removal of the catalyst and evaporation of the solvent in vacuo yields the white solid product. The nmr spectrum ($CCl_4$) displays three sharp singlets at $\gamma$ 8.09, 8.84 and 8.62 (8-$CH_3$) which are superimposed on a broad OH signal. An additional singlet appears at $\gamma$ 2.38 (N=CH).

The 2-iminoimidazolidine-1,3-dioxides of Formula V are prepared by oxidation of the corresponding 2-amino-imidazoline-3-oxide-1-oxyls (where $R_1$=H) using the standard oxidation techniques previously described. Suitable oxidizing agents include $PbO_2$, $Br_2$, $Cl_2$, $NaIO_4$, and the like, which may be used in inert solvents such as water, methylene chloride, benzene, ether, etc.

The oxidation products may then be subjected to reduction subject to the general reaction conditions disclosed above.

EXAMPLE 21

Preparation of 2-imino-4,4,5,5-tetramethylimidazolidine-1,3-dioxide

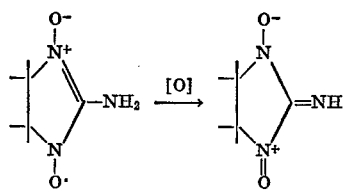

(A) To a solution of 64 mg. of 2-amino-4,4,5,5-tetramethylimidazoline-3-oxide-1-oxyl and 200 mg. NaHCO$_3$ dissolved in 100 ml. of water, is added 4.0 ml. of 0.1 molar sodium periodate solution (1.08 equiv.). The resulting purple solution is extracted three times with 20 ml. of CH$_2$Cl$_2$. The combined extracts are dried over Na$_2$SO$_4$ and evaporated in vacuo at 20° C. to leave 60 mg. of the named crystalline product (98%), M.P., 76° C. The compound is recrystallized from hexane.

*Analysis.*—Calcd. for C$_7$H$_{13}$N$_3$O$_2$ (percent): C, 49.11; H, 7.65; N, 24.55. Found (percent): C, 48.95; H, 7.56; N, 24.58.

(B) To a solution of 64 mg. of 2-amino-4,4,5,5-tetramethylimidazolidine-3-oxide-1-oxyl dissolved in 30 ml. CH$_2$Cl$_2$, is added 2.0 g. of PbO$_2$. The mixture iis stirred at room temperature for 30 minutes. The resulting purple solution is centrifuged, and the supernatant liquid decanted and evaporated in vacuo at 20° C. yielding 51 mg. of a crystalline solid which is identical to the product obtained by the procedure of part (A).

The thus obtained product is reduced to 2-amino-4,4,5,5-tetramethylimidazolidine-3-oxide-1-oxyl in the presence of potassium borohydride dissolved in methanol, to which sodium hydroxide is added.

The 2 - imino-4,4,5,5-tetramethylimidazolidine-1,3-dioxide may be converted to acylimino derivatives (R$_2$ is

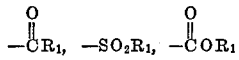

etc.) by reaction with a Type "A" reagent as defined above wherein R$_2$ is a strong electron withdrawing group.

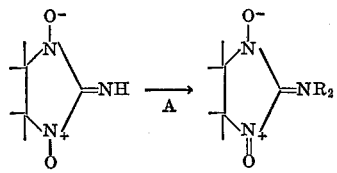

The 2-acylimino derivatives (R$_2$ is

etc.) of tetramethylimidazolidine-1,3-dioxide may also be prepared by reaction of 2-amino-4,4,5,5-tetramethylimidazoline-3-oxide-1-oxyl with a Type "A" reagent in the presence of air.

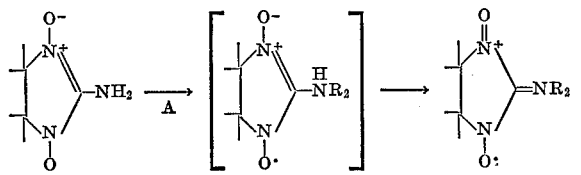

Standard acylation procedures are used. Acylation of the unoxidized 2-aminoimidazoline-3-oxide-1-oxyls leads directly to the substituted imino compounds due to air oxidation of the intermediate acylamino derivatives.

The following example is presented by way of illustration.

EXAMPLE 22

Preparation of 2-trifluoroacetylimino-4,4,5,5-tetramethylimidazolidine-1,3-dioxide

PROCEDURE A

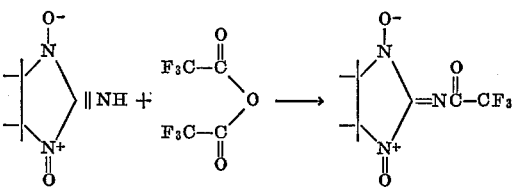

To 105 mg. of freshly prepared 2-imino-4,4,5,5-tetramethylimidazolidine-1,3-dioxide dissolved in 20 ml. of CH$_2$Cl$_2$ is added 0.4 ml. of trifluoroacetic anhydride. The color changes instantaneously from purple to deep-red. After washing with water, the organic phase is dried over Na$_2$SO$_4$. Evaporation in vacuo at 25° C. gives 134 mg. of red crystals, M.P. 125–130° C., which after recrystallization from benzene-hexane, gives 100 mg. of the product (61%) M.P. 134–136° C.

*Analysis.*—Calcd. for C$_9$H$_{12}$N$_3$O$_3$F$_3$ (percent): C, 40.45; H, 4.53; N, 15.73; F, 21.35. Found (percent): C, 40.69; H, 4.49; N, 15.47; F, 21.7.

Alternatively, the named product may be obtained from the 2-amino-4,4,5,5-tetramethylimidazolidine 3-oxide-1-oxyl in the manner illustrated in Procedure B.

PROCEDURE B

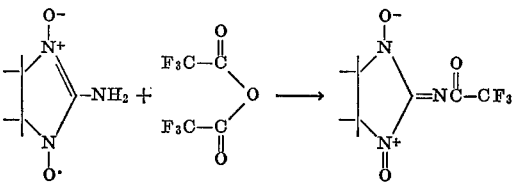

To 100 mg. of 2-amino-4,4,4,5-tetramethylimidazolidine-3-oxide-1-oxyl dissolved in 20 ml. CH$_2$Cl$_2$ was added 0.4 ml. of trifluoroacetic anhydride. The color changes at once from blue to deep red. After washing with water, the organic phase is dried over Na$_2$SO$_4$ and evaporated in vacuo at 25° C. to leave 83 mg. of a partially crystalline material, M.P. 90° C.

Preparative thin layer chromatography followed by recrystallization from benzene-hexane affords 30 mg. of product that was identical with the product obtained by Procedure A.

As a special case, 2-trifluoroacetylimino-4,4,5,5-tetramethylimidazoline-1,3-dioxide, when reduced, forms 2-trifluoroacetylamino - 4,4,5,5 - tetramethylimidazoline-3-oxide-1-oxyl as an intermediate which in the presence of base, yields as the final product 2-trifluoroacetylamido-4,4,5,5-tetramethylimidazoline-3-oxide-1-oxyl potassium salt.

EXAMPLE 23

Preparation of 2-trifluoroacetylamido-4,4,5,5-tetramethylimidazoline-3-oxide-1-oxyl potassium salt

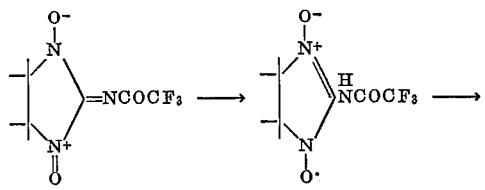

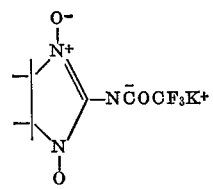

To several ml. of a solution of 10 mg. of KBH₄ in methanol, is added 35 mg. of 2-trifluoroacetylimino-4,4,5,5-tetramethylimidazolidine-1,3-dioxide and 1 drop of aqueous 2 N NaOH. The resulting blue solution displays a characteristic 5-line ESR spectrum for the above radical anion. The 2-trifluoroacetylamino-4,4,5,5-tetramethylimidazoline-3-oxide-1-oxyl cannot be isolated as it undergoes ionization upon formation to yield the named product.

The above reaction is repeated using isopropanol, tetrahydrofuran, and dimethoxyethane in place of methanol, obtaining the same results.

The mercapto and organomercapto substituted dihydroimidazoles are prepared from imidazoline-3-oxide-1-oxyls according to the following mercapto reaction sequence:

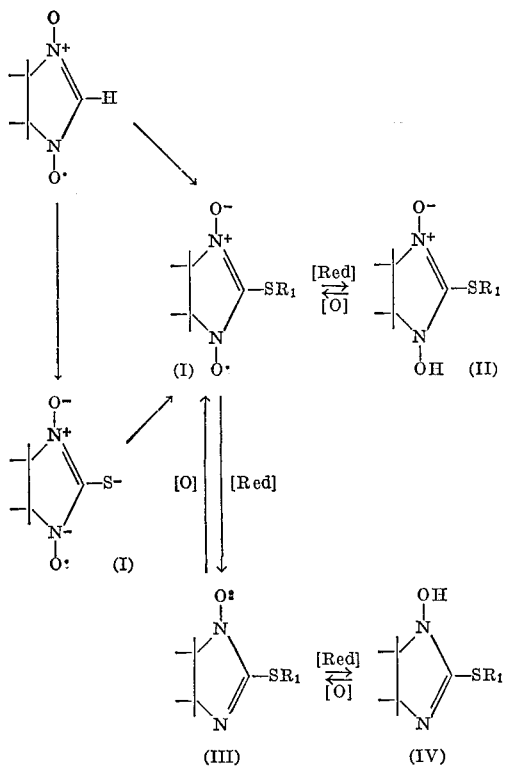

wherein $R_1$ is as defined above. The Roman numerals near the formula correspond with the general formulas earlier described.

The 2-unsubstituted starting material may be prepared according to the method set out hereafter or from those described in copending U.S. application Ser. No. 696,718, filed Jan. 10, 1968, now abandoned.

The mercapto anions are prepared from the corresponding imidazole-3-oxide-1-oxyl as shown above by treatment with a strong base such as potassium tert-butoxide in tetrahydrofuran, followed by reaction with sulfur. Other strongly alkaline media may be used such as those described in copending U.S. application Ser. No. 885,332, now U.S. Pat. 3,697,535, entitled "4,5-Dihydroimidazoline-1-Oxide-3-Oxyl-2-yl Mercuric Compounds."

The thus obtained mercapto anions may be alkylated with a suitable agent according to the following formula:

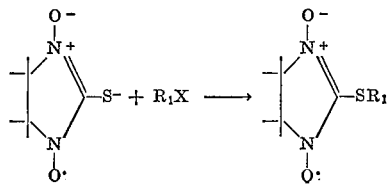

In the above reaction $R_1$ is as already defined and typically may include such groups as —CH₃,

—CH₂C₆H₄F,

—CH₂CH₂CH=CH₂, —CH₂COOC₂H₅, —CH₂OCH₃,

—CH₂COCH₃, —CH₂CH(OC₂H₅)₂,

—CH₂CONHC₆H₄NO₂,

—CH₂CH₂CH₂CN,

and the like. It is preferred that the carbon atom which attaches to the sulfur should be saturated.

The mercapto radical anion is prepared and used in situ and need not be isolated. The alkylating agent is usually added in excess but not less than one equivalent. A weak acid such as ammonium chloride may be added to destroy excess base prior to addition of the alkylating agent. This reduces the amount of alkylating agent required since it is attacked by the base. The reaction is carried out at temperatures and time depending upon the reactivity of the alkylating agent, e.g. 10 minutes to 24 hours at 0° to 120° C.

The following examples are presented by way of illustration only, and it should be understood that although the examples are directed to particular compounds, the $R_1$ substituent may be any group within the broad scope of the invention as defined above.

EXAMPLE 24

Preparation of 2-mercapto-4,4,5,5-tetramethylimidazoline-3-oxide-1-oxyl

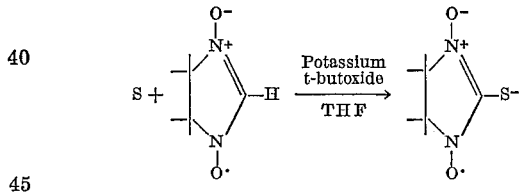

To a mixture of 300 mg. of potassium t-butoxide and 10 ml. of anhydrous tetrahydrofuran is added under nitrogen a solution of 157 mg. (1 meq.) of 4,4,5,5-tetramethylimidazoline-3-oxide-1-oxyl in 6 ml. of tetrahydrofuran over a period of 3 minutes. Then, 32 mg. (1 meq.) of sublimed sulfur is added and the solution stirred at room temperature for 5 minutes. Water is added and the solution repeatedly extracted with chloroform. The aqueous solution contains the nearly pure radical anion which is identified by its distinctive ESR spectrum, $A_{N_1}=A_{N_2}=8.84$ gauss.

EXAMPLE 25

Preparation of 2-butylmercapto-4,4,5,5-tetramethylimidazoline-3-oxide-1-oxyl

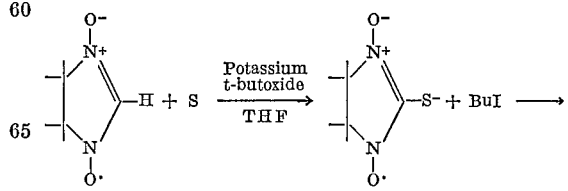

To a mixture of 300 mg. of potassium t-butoxide and 5 ml. of dry tetrahydrofuran is added a solution of 157 mg. of 4,4,5,5-tetramethylimidazoline-3-oxide-1-oxyl in 5 ml. of tetrahydrofuran under nitrogen. This solution is treated with 28 mg. of sublimed sulfur. After stirring at room temperature for 5 minutes, 91 mg. of ammonium chloride is added followed by 1.5 ml. of butyl iodide and 15 ml. of ethanol. The mixture is heated at 50° C. for 1.5 hours, and then diluted with 50 ml. portions of chloroform. The blue chloroform solution is dried over magnesium sulfate, evaporated in vacuo, and chromatographed on silica gel with ether. The named product is obtained as a blue oil.

*Analysis.*—Calcd. for $C_{11}H_{21}N_2O_2S$ (percent): C, 53.84; H, 8.63; N, 11.43. Found (percent): C, 53.49; H, 8.60; N, 11.13.

EXAMPLE 26

Preparation of 2-methylmercapto-4,4,5,5-tetramethylimidazoline-3-oxide-1-oxyl

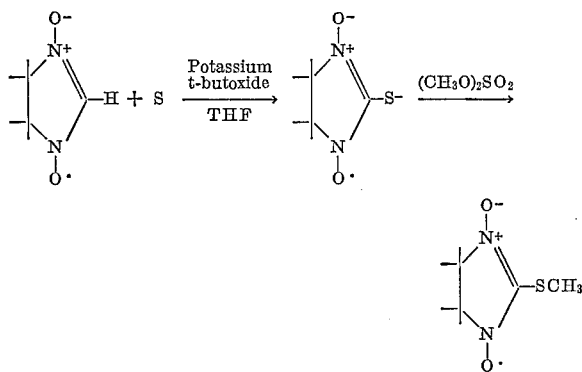

The mercapto radical anion is prepared exactly as in Example 24 except that instead of addition of water, there is added 1.5 ml. of dimethyl sulfate and 0.5 g. of potassium t-butoxide. After stirring for 10 minutes, the mixture is diluted with 50 ml. of water and extracted four times with chloroform. The extracts are dried over magnesium sulfate and evaporated in vacuo, and the residue chromatographed on silica gel with ether. The blue methylmercapto radical is obtained in 31% yield (64 mg.) on evaporation of the solvent; M.P. after recrystallization from hexane is 81–82° C.

*Analysis.*—Calcd. for $C_8H_{15}N_2O_2S$ (percent): C, 47.26; H, 7.44; N, 13.78. Found (percent): C, 47.41; H, 7.44; N, 13.85.

Referring back to the general mercapto reaction sequence it is seen that the organo mercapto compounds may alternatively be obtained directly from imidazoline-3-oxide-1-oxyls by reaction of said imidazolines with disulfides. The reaction is represented by the following formula:

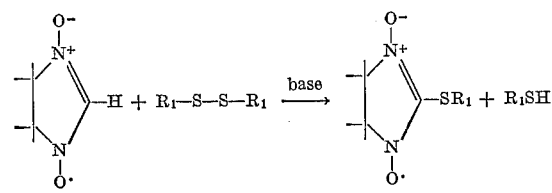

This is a general method which applies for any $R_1$ within the broad definition. Typical organo groups represented by $R_1$ include:

—$C_4H_9$

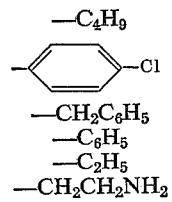

—$CH_2C_6H_5$
—$C_6H_5$
—$C_2H_5$
—$CH_2CH_2NH_2$
—$CH_2CH(NH_2)COOH$
—$C_6H_4NO_2$
—$CH_2CH_2CH_2OH$
—Cyclooctyl
—$CH_2(CH_2)_4CONH_2$
—$CH_2CH_2C\equiv CH$
—$CH_2CH_2CH_2CN$

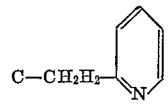

—$CH_2(CH_3)CH(OH)C_6H_5$
—$CH_2CH_2OCH_2C_6H_5$
—$CH_2CH_2CH_2COCH_3$ and

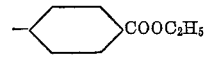

The reaction may be carried out in a manner similar to that for obtaining the mercapto imidazoles, except that a disulfide is employed in place of sulfur. Generally, the reaction may be carried out at from 0° C. to 50° C., preferably at room temperature, and from times ranging from five minutes to 3 hours, the exact time of reaction dependent upon the reactants and the reaction temperatures selected. Suitable solvents include tetrahydrofuran, dimethylsulfoxide, hexamethylphosphoramide, dimethoxyethane and the like. Suitable bases include tertiary alkoxides, lithium diethylamide, sodium hydride, etc. Recovery of product is accomplished by standard techniques such as chromatography, drying and recrystallization, etc.

EXAMPLE 27

Preparation of 2-methylmercapto-4,4,5,5-tetramethylimidazoline-3-oxide-1-oxyl

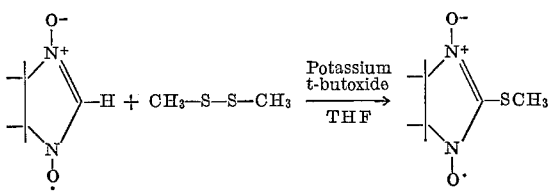

To a mixture of 300 mg. of potassium tert-butoxide and 5 ml. of dry tetrahydrofuran is added under nitrogen a solution of 157 mg. of 4,4,5,5-tetramethylimidazoline-3-oxide-1-oxyl in 5 ml. of tetrahydrofuran over a period of 5 minutes. An additional 5 ml. of tetrahydrofuran is added followed by 0.3 ml. of dimethyl disulfide. After 10 minutes at room temperature, the mixture is worked up as in Example 25 to give 39 mg. (19%) of the blue 2-methylmercapto radical.

As shown in the general mercapto reaction scheme, the organo mercapto - 1-hydroxy-4,4,5,5-tetramethylimidazoline-3-oxide is prepared by the reduction of the corresponding imidazoline-3-oxide-1-oxyl. The reduction can be carried out in the same manner as already set forth for the amino substituted imidazolines using these reducing agents described in Table 1, e.g. Na, magnesium, and the like in a suitable solvent such as t-butyl alcohol, or water. The reaction may be carried out under nitrogen to prevent auto-oxidation, and at 0° C. or above. The 1-hydroxy imidazoline-3-oxides can be thereafter oxidized according to the same general techniques as described for the amino substituted imidazolines.

EXAMPLE 28

Preparation of 2-butylmercapto-1-hydroxy-4,4,5,5-tetramethylimidazoline-3-oxide

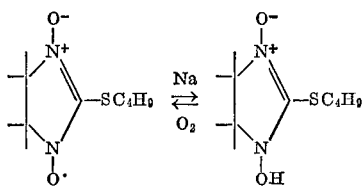

To a solution of 20 mg. of 2-butylmercapto-4,4,5,5-tetramethylimidazoline-3-oxide-1-oxyl in 5 ml. of tert-butyl alcohol is added excess sodium metal (~20 mg.). The solution is stirred under nitrogen until the color has disappeared. The resulting solution is neutralized with acetic acid after removal of the sodium. Evaporation to dryness in vacuo is followed by extraction of the residue with methylene chloride. Evaporation of the extracts yields the named white solid product. This compound gradually reoxidizes in air to give the starting material.

As indicated, the organo mercapto-imidazoline-1-oxyl can be prepared by an appropriate reduction of an organomercapto imidazoline-3-oxide-1-oxyl. The reduction can be carried out using those reducing agents and solvents as set forth above for reduction of compounds of structure I to compounds of structure III. The reaction can be carried out at room temperature and is continued until the color of the reaction solution changes. The reverse oxidation reaction can be carried out according to the general procedures disclosed above.

The organo-mercapto imidazoline-1-oxyl may alternatively be obtained (1) as a byproduct in the reaction of 4,4,5,5-tetramethylimidazoline - 3 - oxide-1-oxyl with sulfur and an alkylating agent in the presence of potassium t-butoxide and tetrahydrofuran, (2) as a byproduct in the reaction of 4,4,5,5-tetramethylimidazoline-3-oxide-1-oxyl with a disulfide in the presence of potassium t-butoxide and tetrahydrofuran, and (3) by the reaction of 2-bromo - 4,4,5,5 - tetramethylimidazoline - 1 - oxyl with NaSR$_1$ and R$_1$SH, where R$_1$ is as generally defined. The last named reaction can be carried out in water, alcohol, or other inert solvents such as dimethoxyethane, tetrahydrofuran and the like at from 0°–100° C. for from several minutes to several hours.

The above-described reactions are illustrated by the following examples.

EXAMPLE 29

Preparation of 2-methylmercapto-4,4,5,5-tetramethylimidazoline-1-oxyl

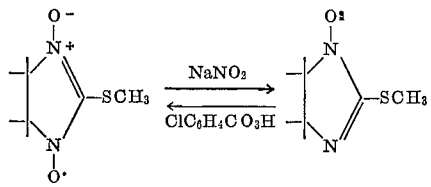

A solution of 50 mg. of 2-methylmercapto-4,4,5,5-tetramethylimidazoline-3-oxide-1-oxyl in 2 ml. of dimethylformamide is stirred at room temperature with 200 mg. of sodium nitrite until the color changes from red to orange. The solution is then filtered, diluted with 5 ml. of benzene and stirred for several minutes with 0.5 g. of lead dioxide. This solution is then filtered, concentrated in vacuo, and diluted with water. Extraction of the aqueous solution with chloroform and evaporation of the chloroform yields the title compound. Purification is achieved by chromatography on silica gel.

This product is stirred at room temperature for several minutes with 1 equivalent of m-chloroperbenzoic acid in methylene chloride and the resulting solution is washed with aqueous sodium carbonate. The reoxidized 2-methylmercapto - 4,4,5,5 - tetramethylimidazoline-3-oxide-1-oxyl is obtained in the residue after evaporation of the organic solution to dryness.

EXAMPLE 30

Preparation of 2-butylmercapto-4,4,5,5-tetramethylimidazoline-1-oxyl

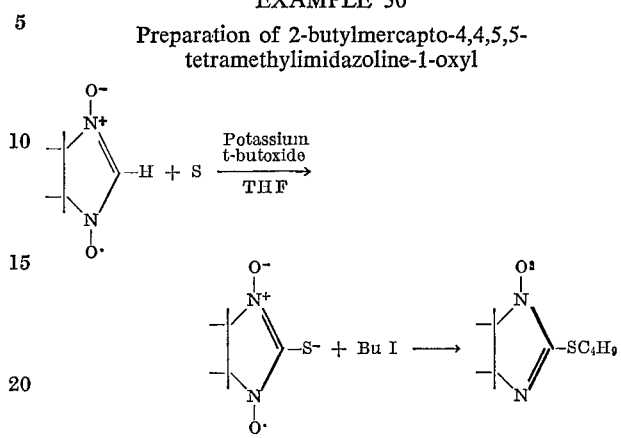

The procedure of Example 24 is repeated, the blue chloroform solution dried over magnesium sulfate, evaporated in vacuo and chromatographed on silica gel with ether. In addition to the named product reported in Example 24, there is isolated 56 mg. of 2-butylmercapto-4,4,5,5-tetramethylimidazoline-1-oxyl which is identified by its ESR spectrum.

EXAMPLE 31

Preparation of 2-methylmercapto-4,4,5,5-tetramethylimidazoline-1-oxyl

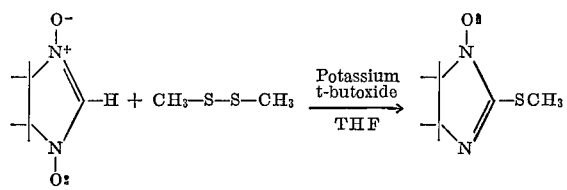

As an alternate procedure for reducing the imidazoline, the method of Example 27 is repeated, the reaction product dried, evaporated in vacuo, and the residue chromatographed on silica gel with ether. In addition to the blue methyl mercapto product reported, there is additionally obtained 106 mg. of the yellow 2-methylmercapto-4,4,5,5-tetramethylimidazoline as an oil with a characteristic 9-line ESR spectrum.

EXAMPLE 32

Preparation of 2-methylmercapto-4,4,5,5-tetramethylimidazoline-1-oxyl

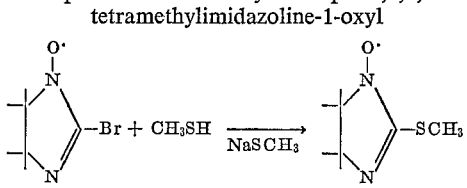

To 0.11 g. of 2-bromo-4,4,5,5-tetramethylimidazoline-1-oxyl, and 0.06 g. if methylmercapto dissolved in 8 ml. of methanol is added 0.10 g. of NaSCH$_3$. After one hour the solvent is removed in vacuo and the residue chromatographed on silica gel with ether to yield 0.052 g. (62%) of the named crystalline product.

The 1-hydroxy - 2 - organomercapto imidazoline may be prepared by a reduction of the corresponding mercapto imidazoline - 1 - oxyl as illustrated in the following example. The reducing agents and solvents employed can be the same as those used in the reduction of organomercapto-imidazoline - 3 - oxide - 1 - oxyls, suitable agents set forth in Table I. The reverse oxidation reaction is carried out according to the general procedures employing such oxidizing agents as set forth in Table II.

EXAMPLE 33

Preparation of 1-hydroxy-2-methylmercapto-4,4,5,5-tetramethylimidazoline

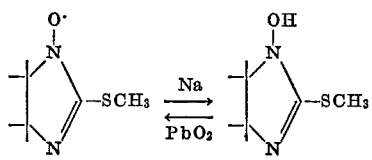

To a solution of 20 mg. of 2-methylmercapto-4,4,5,5-tetramethylimidazoline - 1 - oxyl in 5 ml. of tert-butyl alcohol is added excess sodium metal (>25 mg.). The solution is stirred under nitrogen until the color has disappeared. The resulting solution is neutralized with acetic acid after removal of the excess sodium. Evaporation to dryness in vacuo is followed by extraction of the residue with methylene chloride. Evaporation of the extracts yield the named white solid product.

This compound is reoxidized to the starting material by treatment with a methylene chloride solution of lead dioxide followed by filtration and evaporation of the filtrate.

The derivatives of Formulas III and IV where R is $OR_1$, are prepared according to the following alkoxy reaction sequence:

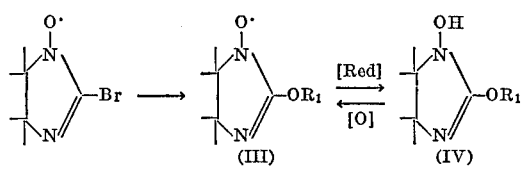

where $R_1$ is as broadly defined above. The Roman numerals correspond to the general formulas earlier described.

In the above sequence, the compounds of Formula IV, wherein $R_1$ is H, will be obtained as the tautomeric mixture of general Formula VI. The starting material, 2-bromo - 4,4,5,5 - tetramethyl-imidazoline - 1 - oxyl may be prepared by an appropriate reduction of a 2-bromo-imidazoline - 3 - oxide - 1 - oxyl, the preparation of such bromo compounds described in copending U.S. application Ser. No. 724,591, filed Apr. 26, 1968, now abandoned.

The preparation of the alkoxy radicals proceeds according to the following formula:

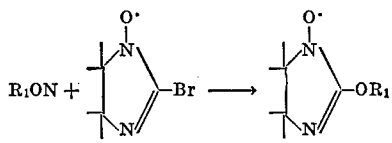

The reaction is carried out in either the neat alcohol $R_1OH$ or in an inert solvent such as dimethoxyethane, tetrahydrofuran, dimethylsulfoxide, ether, benzene, and the like. The metal alkoxide can be added as such or generated in situ from the alcohol and a strong base such as sodium hydride. When $R_1$=H, a metal hydroxide is used. The reaction is carried out at 0°–100° C. for from several minutes to several hours.

Suitable $R_1$ groups include:

$CH_3-$
$C_2H_5-$
cyclohexyl
$C_6H_5-$
$NO_2C_6H_4CH_2-$

$(CH_3)_2NCH_2CH_2-$
$C_2H_5SCH_2CH_2-$
cyclobutyl
$CH\equiv CCH_2-$
$C_6H_4CH=CHCH_2-$
$N\equiv CCH_2CH_2-$ $(CH_3)_3\overset{+}{N}CH_2CH_2-$

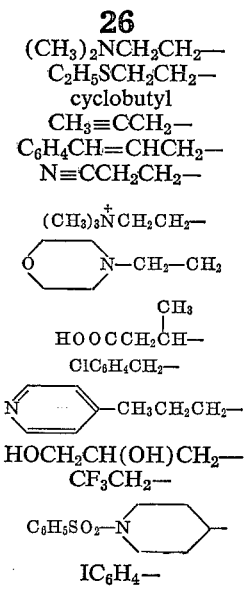

$HOOCCH_2\overset{CH_3}{\underset{|}{C}H}-$
$ClC_6H_4CH_2-$ $HOCH_2CH(OH)CH_2-$
$CF_3CH_2-$ $IC_6H_4-$ and the like.

Other groups within the scope of $R_1$ will be readily apparent to those of ordinary skill in the art.

The following examples are presented by way of illustration only, and it should be understood that $R_1$ may be any group within the scope already disclosed.

EXAMPLE 34

Preparation of 2-hydroxy-4,4,5,5-tetramethylimidazoline-1-oxyl

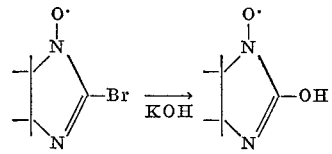

A suspension of 2-bromo-4,4,5,5-tetramethylimidazoline-1-oxyl (55 mg.) in 10 ml. of 2NKOH is stirred at 70° C. for 20 minutes to give a solution of the named product which is identified by its ESR spectrum. The product exists as a tautomeric mixture with 4,4,5,5-tetramethylimidazolidine-2-one-1-oxyl predominating.

EXAMPLE 35

Preparation of 2-methoxy-4,4,5,5-tetramethylimidazoline-1-oxyl

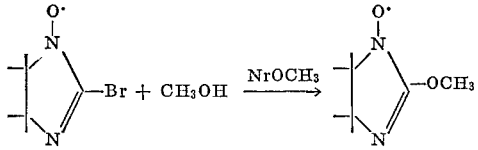

To 0.11 g. of 2-bromo - 4,4,5,5 - tetramethylimidazoline-1-oxyl, dissolved in 8 ml. of methanol is added 0.10 g. of sodium methoxide. After one hour the solvent is removed in vacuo and the residue chromatographed on silica gel with ether to yield 0.052 g. (62%) of the named crystalline product. A sample recrystallized from ether/chloroform melts at 58–59° C.

*Analysis.*—Calcd. for $C_8H_{15}N_2O_2$ (percent): C, 56.12; H, 8.83; N, 16.36, mol. wt. 171. Found (percent): C, 56.00; H, 8.87; N, 16.70; m/e 171 (M+).

The 2-alkoxy 4,4,5,5-tetramethylimidazoline-1-oxyl can be reduced to obtain the 1-hydroxy-2-alkoxy-4,4,5,5-tetramethylimidazoline using the reducing agents and solvents as set out in Table I. The reaction product can be oxidized according to the general oxidation procedures as already disclosed.

The 1-hydroxy-2-alkoxy derivative where $R_1$ is H may alternatively be obtained by a special reaction of 4,4,5,5-tetramethylimidazoline-1-oxyl.

It has also been found that as a special case the 1,2-hydroxy derivative may be obtained by reaction of an imidazolidinone-1,3-dioxide with triphenyl phosphine.

EXAMPLE 36

Preparation of 1,2-hydroxy-4,4,5,5-tetramethyl-imidazoline

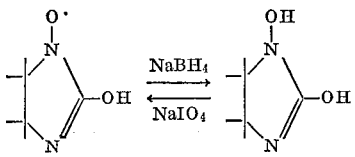

Forty mg. of 2-hydroxy-4,4,5,5-tetramethylimidazoline-1-oxyl is dissolved in 10 ml. of 2 N KOH, 10 mg. of potassium borohydride added, and the mixture stirred for 3 minutes. The reaction mixture is then neutralized with 2 N HCl and evaporated to dryness in vacuo. The residue is continuously extracted with ethyl acetate. Upon removal of the solvent, the 1,2-hydroxy-4,4,5,5-tetramethyl-imidazoline is recovered. The compound is obtained as a tautomeric mixture.

The thus obtained product is dissolved in methylene chloride and shaken with aqueous sodium periodate solution. The organic layer, after drying over magnesium sulfate, displays the strong characteristic ESR spectrum of the starting compound: $A_{N_1}$ 10.16 gauss, $A_{N_2}$ 1.60 gauss, $A_H$ 1.65 gauss.

EXAMPLE 37

Preparation of 1,2-hydroxy-4,4,5,5-tetramethyl-imidazoline

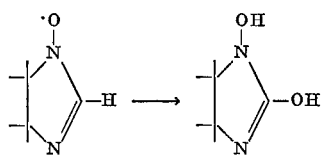

A sample of 4,4,5,5-tetramethylimidazoline - 1 - oxyl, 0.350 g., is left overnight at room temperature. Addition of ether yields a white insoluble crystalline compound. The white solid is recrystallized from methanol ether to give 92 mg. of the named product as part of a tautomeric mixture, M.P. 229–230° C. (70%), the product 1-hydroxy-4,4,5,5-tetramethylimidazolin-2-one prodominating.

*Analysis.*—Calcd. for $C_7H_{14}N_2O_2$ (percent): C, 53.14; H, 9.92; N, 17.71, mol. wt. 158. Found (percent): C, 53.01; H, 8.81; N, 17.50; m./e 158 (M+).

EXAMPLE 38

Preparation of 1,2-hydroxy-4,4,5,5-tetramethyl-imidazoline

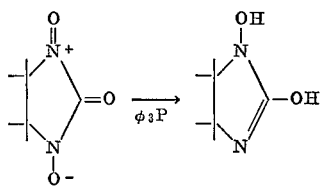

To a solution of 10 mg. of 4,4,5,5-tetramethylimidazolidin-2-one-1,3-dioxide in methanol is added dropwise triphenylphosphine with stirring until the orange color has completely faded. After evaporation to dryness, the residue is taken up in water, filtered, and then continuously extracted with ethyl acetate. Evaporation of the extracts yields the crude named product, as a tautomeric mixture, the 1-hydroxy imidazolidin-2-one form predominating.

The starting materials used in the above-described general reaction sequences can be prepared by methods well known in the art. For example, the 2-unsubstituted-imidazoline-3-oxide-1-oxyl starting material in the mercapto reaction sequence may be prepared according to the following reaction:

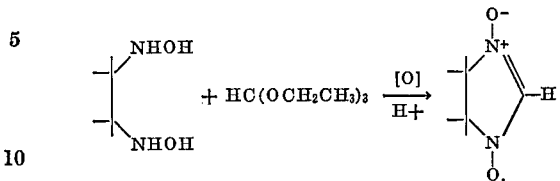

The bis-hydroxyl amine is dissolved in tetrahydrofuran or benzene and treated with at least 1 equiv. of

and more than 1 equiv. of a strong acid such as $CF_3COOH$ or benzene-sulfonic acid. The reaction mixture is heated from 1 minute to 10 hours and the acid extracted. The resulting compound undergoes air oxidation. This and other preparations are described in more detail in copending U.S. applications Ser. No. 696,718, filed Jan. 10, 1968, and Ser. No. 740,055, filed June 26, 1968, both now abandoned, and incorporated herein by reference.

The 2-unsubstituted imidazoline-1-oxyl used as the starting material in Examples 17 and 37 can be obtained by a reduction of the above prepared imidazoline-3-oxide-1-oxyl following the general reduction procedures as already set forth. For example, the reduction may be carried out using sodium nitrite in a dimethylformamide solvent. A more detailed discussion of this technique and others appears in copending U.S. application Ser. No. 752,744, filed Aug. 15, 1968, now abandoned, and incorporated herein by reference.

The 2-bromo-imidazoline starting material in the preparation of the amino derivatives may be obtained from the corresponding 2-unsubstituted-imidazoline by reaction with $NaHCO_3$ and BrCN, illustrated below.

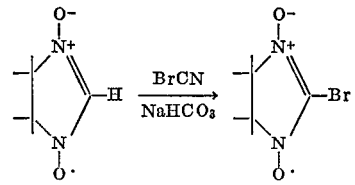

The reaction ingredients are dissolved in water and stirred for a suitable length of time and then the reaction product is recovered by standard techniques. For additional preparation techniques, see copending U.S. application Ser. No. 724,591, filed Apr. 26, 1968, now abandoned, and incorporated herein by reference.

The 2-bromo-1-oxyl-imidazoline starting materials of Examples 14–16, and the alkoxy reaction sequence may be prepared by a suitable reduction of the corresponding 2-bromo-1-oxyl - 3 - oxide - imidazoline according to the standard techniques disclosed above for the reduction of the amino imidazoline derivatives, and illustrated in copending U.S. application Ser. No. 752,744, filed Aug. 15, 1968, now abandoned.

The imidazolin-2-one-1,3-dioxide starting material employed in Example 38 may be obtained from the corresponding 2-bromo-imidazoline-3-oxide-1-oxyl by reaction with a strong acid such as sulfuric acid.

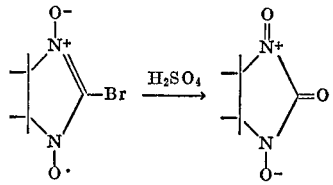

More specifically, the bromoimidazoline is added to sulfuric acid, e.g. 4 N sulfuric acid, heated and allowed to react for a short period of time, usually less than an hour. The solution is then extracted with chloroform and the product recovered by standard techniques. This and other alternate methods of preparation are set forth in copending U.S. application Ser. No. 724,591, filed Apr. 26, 1968, now abandoned.

The above-described methods of preparation for the starting compounds and others will be apparent to those of ordinary skill in the art.

The foregoing discussions have employed a simple bis-hydroxylamine structure which provides the requisite tertiary structure of the $C_4$ and $C_5$ carbon atoms through the use of four methyl groups. In the preferred embodiment, $R_3$, $R_4$, $R_5$ and $R_6$ are each alkyl, alkenyl, alkynyl, aryl, substituted alkyl, each of from 1 to 12 carbon atoms of $R_3$–$R_4$ and/or $R_5$–$R_6$ are alkylene or alkenylene groups of from 3–10 carbon atoms each. The alkylene or alkenylene groups additionally may contain alkyl or aryl substituents if desired.

To obtain compounds of this invention having any particular desired atomic configuration, it is merely necessary to select the corresponding bis-hydroxylamine and proceed with one of the reactions as described in copending U.S. application Ser. No. 740,055, filed June 26, 1968, now abandoned, to form the hydroimidazole ring. The bis-hydroxylamine can be prepared by reducing a corresponding dinitro compound. The dinitro compounds and their methods of preparation are well known in the art. The general reaction path is as follows and involves a reaction of a salt of a secondary nitro compound and a halonitro compound having a halogen atom and nitro group on the same carbon atom.

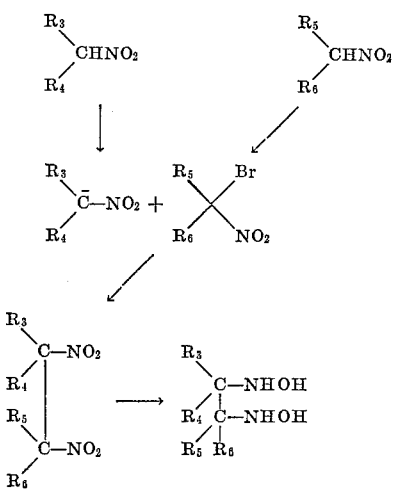

wherein $R_3$, $R_4$, $R_5$ and $R_6$ are as already defined. These compounds may in turn be reacted in the manner above described to form the 2-unsubstituted-imidazole-3-oxide-1-oxyl compounds.

All of the foregoing invention has been described in some detail by way of illustration for purposes of clarity of understanding. It will be apparent to one skilled in this art that certain changes and modifications may be practiced within the spirit of this invention as limited only by the scope of the appended claims.

What we claim is:

1. Imidazoline of the formula:

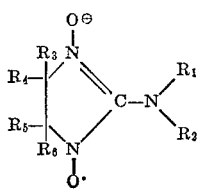

wherein:

each of $R_{3-6}$ are alkyl of from 1 to 12 carbon atoms; and $R_1$ is hydrogen, alkali metal, lower alkyl, lower alkenyl, with the double bond separated from nitrogen by at least one carbon atom, phenyl, halophenyl, nitrophenyl, carboxyphenyl, cyanophenyl, tolyl or

—$COR_7$ wherein:

$R_7$ is lower alkyl, lower alkoxy, phenyl or substituted phenyl wherein said substituents are selected from the group consisting of cyano, carboxy, halo, nitro, and methyl; and $R_2$ is hydrogen, lower alkyl, or, when taken together with $R_1$, alkylene of from 2 to 6 carbon atoms.

2. An imidazoline in accordance with claim 1, wherein $R_{3-6}$ are methyl and $R_1$ and $R_2$ are hydrogen.

3. An imidazoline in accordance with claim 1, wherein $R_{3-6}$ are methyl and $R_1$ is hydrogen and $R_2$ is isopropyl.

4. An imidazoline in accordance with claim 1, wherein $R_{1-6}$ are methyl.

5. An imidazoline in accordance with claim 1, wherein $R_{3-6}$ are methyl, $R_1$ is acetyl, and $R_2$ is isopropyl.

6. An imidazoline in accordance with claim 1, wherein $R_{3-6}$ are methyl, $R_1$ is ethoxycarbonyl and $R_2$ is isopropyl.

7. An imidazoline in accordance with claim 1, wherein $R_{3-6}$ are methyl, $R_1$ is benzoyl, and $R_2$ is isopropyl.

8. An imidazoline in accordance with claim 1, wherein $R_{3-6}$ are methyl, $R_1$ is potassium cation, and $R_2$ is hydrogen.

9. An imidazoline in accordance with claim 1, wherein $R_{3-6}$ are methyl, $R_1$ is potassium cation, and $R_2$ is isopropyl.

10. An imidazoline in accordance with claim 1, wherein $R_{3-6}$ are methyl, and $R_1$ and $R_2$ are taken together to form an ethylene bridge.

11. 2 - (N-diethylaminocarbonyloxycarbonyl-N-isopropylamino)-4,4,5,5-tetramethylimidazoline-3-oxide-1-oxyl.

12. 2-trifluoroacetylamido - 4,4,5,5 - tetramethylimidazoline-3-oxide-1-oxyl potassium salt.

References Cited
UNITED STATES PATENTS 3,322,542  5/1967  Ullman et al. _____ 96—90 PC

OTHER REFERENCES

Boocock et al., J. Amer. Chem. Soc., vol. 90, pp. 5945–6 (1968). QD1.A5.

Boocock et al., J. Amer. Chem. Soc., vol. 90, pp. 6873–4 (1968). QD1.A51.

Boocock et al., Chem. Abst., vol. 72, No. 55450p (1970). QD1.A51.

Osiecki et al., J. Amer. Chem. Soc., vol. 90, pp. 1078–9 (1968). QD1.A5

Teruaki et al., Chem. Abst., vol. 72, No. 49102k (1970). QD1.A51.

Ueda et al., Chem. Abst., vol. 60, column 6373 (1964). QD1.A51.

NATALIE TROUSOF, Primary Examiner

U.S. Cl. X.R.

23—230 B, 230 M; 252—401, 402, 403; 260—247.5, 268 H, 293.7, 294.8 G, 294.8 R, 295 HM, 295 R, 296 R, 309.7; 324—43 R